O. D. HAVARD.
DEVICE FOR MEASURING GRANULAR MATERIAL.
APPLICATION FILED NOV. 29, 1910.
1,040,537.
Patented Oct. 8, 1912.
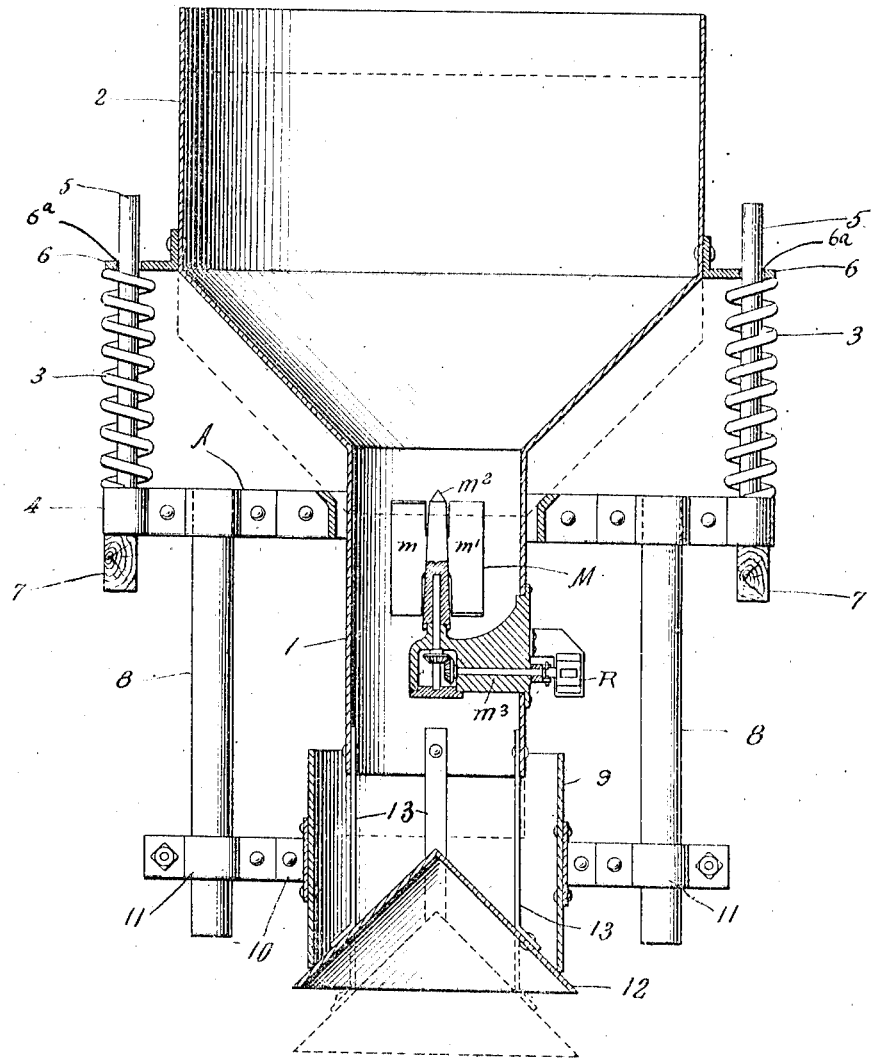
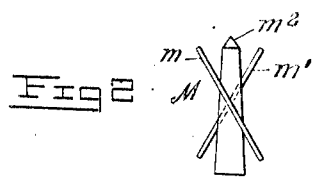

UNITED STATES PATENT OFFICE.

OLIVER D. HAVARD, OF SCRANTON, PENNSYLVANIA.

DEVICE FOR MEASURING GRANULAR MATERIAL.

1,040,537.

Specification of Letters Patent.  Patented Oct. 8, 1912.

Application filed November 29, 1910. Serial No. 594,692.

*To all whom it may concern:*

Be it known that I, OLIVER D. HAVARD, a citizen of the United States, residing at Scranton, in the county of Lackawanna and State of Pennsylvania, have invented certain new and useful Improvements in Devices for Measuring Granular Material, of which the following is a specification.

In my Patent No. 943,405 I have shown a meter suited for measuring broken or granular material such as coal, while the material is passing through a conduit. Where the supply of material is insufficient to keep the conduit constantly filled around the meter vanes, the meter will not register accurately as a small quantity of material fed into the conduit might cause the meter vanes to whirl more rapidly than if the material flowed in a steady stream sufficient to keep the conduit filled.

In my present invention the meter is arranged in a conduit, as in the patent referred to, and means are provided for automatically maintaining that portion of the conduit which surrounds the meter vanes full of material so that the vanes will always be embedded therein. This insures accuracy in the operation of the meter under conditions of an irregular supply of material.

In the accompanying drawing, Figure 1 is a vertical central section through a mechanism embodying my improvements; and, Fig. 2 is a detail of a portion of the meter.
Referring to the drawing, 1 indicates a conduit which is connected to the lower end of a hopper 2 and forms an outlet for the hopper. Within the conduit 1 is arranged a meter M, similar to the meter shown in my patent above referred to, and comprising the vanes $m$, $m'$ mounted upon a spindle $m^2$ which is connected through shafts and gearing, as shown in the drawing, to a register R, all of which parts are supported by an arm $m^3$ which is secured to the conduit 1. The conduit 1 and hopper 2 are supported upon springs 3, which rest upon a frame A and surround guide rods 5 projecting upwardly from said frame through suitable openings $6^a$ in brackets 6 attached to and projecting laterally from the hopper 2. The frame A is supported by suitable means, such as beams 7. A pair of rods 8 depend from the frame A and a pipe-section 9 is adjustably secured to said rods 8 by arms 10 projecting from said pipe section and provided with clamps 11 which engage the rods 8. The pipe-section 9 is larger in diameter than the conduit 1 and extends above the lower end of said conduit when the latter is in its raised position. A valve 12 is connected to the conduit 1 by suitable means such as the straps 13 and in the raised position of the hopper and conduit the valve 12 closes the lower end of the pipe-section 13, as shown in full lines in the drawing.

When the apparatus is empty and not in use, the hopper and valve will remain in the position shown in full lines in the drawing. In use, the tension of the springs is adjusted so that the valve will remain closed under the weight of a column of material extending from the valve up to the meter vanes. The height of this column may be varied by lowering the pipe-section 9 and thus increasing the spring pressure against the pipe-section, and preferably the column will be maintained at a height which extends above the meter and into the lower part of the hopper, so that the vanes will be entirely embedded in the material. When a sufficient quantity of material is dumped into the hopper, the valve opens and allows the material to pass out from the bottom of the column, thus allowing the column to descend and rotate the meter vanes, which operation will continue as long as new material is added and the weight upon the valve is sufficient to hold it open. If the supply of material fed to the hopper stops, the hopper is lifted by the springs and closes the valve when the quantity of material in the hopper is reduced to the predetermined point necessary to keep the meter vanes embedded in the material.

It will be seen that with the automatic controlling feature, material, such as coal, may be dumped into the hopper from conveyers or cars at irregular times and in irregular quantities and since the column of material is always maintained around the meter vanes the meter will always move at a rate substantially in proportion to the rate of movement of the column in the conduit.

In the drawing, the meter M is secured to the conduit and moves with it. The spindle and vanes, in the drawing, project above their supporting arm; but, if desired, the meter-spindle and vanes might be inverted. so as to be suspended from the supporting arm, instead of projecting above it, with the same result.

What I claim is:—

1. In a mechanism for measuring granular material, the combination with an upright conduit for the material and a meter having vanes within the conduit, of means, associated with the conduit, for maintaining a column of said material constantly in engagement with the meter vanes, said means comprising an element controlled by the weight of the granular material.

2. In a mechanism for measuring granular material, the combination with an upright conduit for the material and a meter having vanes within the conduit, of a valve controlled by the weight of the granular material for regulating the flow of material through the conduit, and means, coöperating with said conduit and valve, for maintaining a column of said material in engagement with the meter vanes.

3. In a mechanism for measuring granular material, the combination with yieldingly supported upright material conducting means, and a meter having vanes within said means, of means, associated with the first named means for maintaining a column of said material constantly in engagement with the meter vanes, said means comprising an element controlled by the weight of the granular material in the conducting means.

4. In a mechanism for measuring granular material, the combination with a hopper, a conduit suspended therefrom and a meter, provided with vanes, arranged within the conduit, of means for yieldingly supporting the hopper and conduit, a stationary pipe-section at the lower end of the conduit and forming an extension thereof, and a valve connected to the hopper and conduit and adapted to seat against the lower end of said pipe section.

5. In a mechanism for measuring granular material, the combination with a hopper, a conduit suspended therefrom and a meter, provided with vanes, arranged within and secured to the conduit, of springs for supporting the hopper and conduit, a stationary pipe-section adjustably supported at the lower end of the conduit and forming an extension thereof, and a valve connected to the hopper and conduit and adapted to seat against the lower end of said pipe-section.

In testimony whereof I affix my signature, in presence of two witnesses.

OLIVER D. HAVARD.

Witnesses:
A. V. BOWER,
C. A. BATTENBERG.